| United States Patent [19] | [11] Patent Number: 4,546,673 |
|---|---|
| Shigematsu et al. | [45] Date of Patent: Oct. 15, 1985 |

[54] CONTROL FOR VEHICLE PROVIDED WITH CONTINUOUSLY VARIABLE SPEED SYSTEM POWER TRANSMISSION

[75] Inventors: Takashi Shigematsu; Tomoyuki Watanabe, both of Susono, Japan

[73] Assignee: Toyota Jidosha Kabushiki Kaisha, Toyota, Japan

[21] Appl. No.: 519,149

[22] Filed: Aug. 1, 1983

[30] Foreign Application Priority Data

Aug. 4, 1982 [JP] Japan .................. 57-135147

[51] Int. Cl.[4] ............................................. B60K 41/14
[52] U.S. Cl. ........................................ 74/866; 74/689; 74/856; 74/865
[58] Field of Search ............... 74/689, 856, 857, 858, 74/859, 862, 864, 865, 866

[56] References Cited

U.S. PATENT DOCUMENTS

| 3,927,528 | 12/1975 | van der Kolk et al. | 74/865 X |
|---|---|---|---|
| 4,217,795 | 8/1980 | Sugasawa et al. | 74/858 |
| 4,226,141 | 10/1980 | Espenschied | 74/858 |
| 4,281,567 | 8/1981 | Maurer | 74/858 X |
| 4,318,312 | 3/1982 | Morimoto et al. | 74/864 X |
| 4,397,379 | 8/1983 | Baudoin | 74/866 X |
| 4,445,329 | 5/1984 | Drisko | 74/865 X |
| 4,458,318 | 7/1984 | Smit et al. | 74/866 X |
| 4,458,560 | 7/1984 | Frank et al. | 74/877 X |
| 4,458,561 | 7/1984 | Frank | 74/877 X |
| 4,459,878 | 7/1984 | Frank | 74/865 X |

FOREIGN PATENT DOCUMENTS 2109620 7/1978 Fed. Rep. of Germany ........ 74/866

*Primary Examiner*—Leslie A. Braun
*Assistant Examiner*—Dwight G. Diehl
*Attorney, Agent, or Firm*—Oblon, Fisher, Spivak, McClelland & Maier

[57] ABSTRACT

According to this invention the driver's will to accelerate and decelerate is detected by a pressing amount of an accelerator pedal, or the like. Speed ratio of a continuously variable speed transmission and air-fuel ratio of air mixture in a combustion chamber of an engine are controlled according to that will. As a result, a WOT (Wide Open Throttle) period in which the vehicle travels with the optimum rate of fuel comsumption becomes longer, and an appropriate responsive property in acceleration and the maximum output horse power of an engine is ensured.

4 Claims, 9 Drawing Figures

FIG. 4

| Acc (%)<br>(=Xacc/Xaccmax ×100) | (rpm)<br>Nin* | A/F |
|---|---|---|
| 0 | 800 | 22 |
| 10 | 1400 | 22 |
| 20 | 2000 | 22 |
| 40 | 3000 | 22 |
| 60 | 3600 | 22 |
| 80 | 4000 | 16 |
| 90 | 4300 | 13 |
| 100 | 4800 | 13 |

CONTROL FOR VEHICLE PROVIDED WITH CONTINUOUSLY VARIABLE SPEED SYSTEM POWER TRANSMISSION

BACKGROUND OF THE INVENTION

1. Field of the Invention

This invention relates to a control for a vehicle provided with a continuously variable speed system power transmission capable of continuously varying speed ratio.

2. Description of Prior Art

This applicant disclosed in Japanese prior patent applications No. 40747/82 and No. 67362/82 continuously variable speed system power transmissions for a vehicle which utilizes a continuously variable transmission (hereinafter defined "CVT") to run an engine with the minimum rate of fuel comsumption within the whole range of required horse power. In these transmissions of prior applications, to ensure responsive property in acceleration, a line of the optimum rate of fuel comsumption (a line connecting points which achieve the required horse power with the minimum rate of fuel consumption) is defined, as shown in FIG. 1, by being lowered from WOT (wide open throttle valve of intake system) downward by a predetermined torque allowance to carry out the normal running of an engine along this line of the optimum rate of fuel comsumption. Originally the engine is run the most preferably by WOT. In FIG. 2, the engine is specified such that air-fuel mixture is made lean relative to the stoichiometrical air-fuel ratio while the line of the optimum rate of fuel consumption coincides with the WOT line. However, if the engine running is specified as shown in FIG. 2, the whole engine output torque is reduced so that the maximum output horse power of the engine needed at the minimum can not be ensured and accelerating property depends disadvantageously only upon the responsive property of CVT.

SUMMARY OF THE INVENTION

An object of the present invention is to provide a control for a vehicle provided with a continuously variable speed system power transmission which can ensure the maximum output horse power necessary for an engine at the minimum and run the engine along the line of the optimum rate of fuel consumption coinciding with the WOT line.

Another object of the present invention is to provide a control for a vehicle provided with a continuously variable speed system power transmission which does not cause any troubles in responsive property in acceleration irrespective of running the engine along the WOT line.

To achieve these objects, the control for a vehicle provided with the continuously variable speed system power transmission according to the present invention comprises a detecting means for detecting acceleration and deceleration intended by a driver, a computable means for computing desired air-fuel ratio in a combustion chamber of an engine and desired speed ratio of CVT in relation to the output of the detecting means, an air-fuel ratio controlling means for controlling air-fuel ratio so that air-fuel ratio in the combustion chamber of the engine is the desired air-fuel ratio and a speed ratio controlling means for controlling speed ratio so that speed ratio of CVT is desired speed ratio.

Accordingly, fuel can be saved by increasing WOT period in which a vehicle can travel with the optimum rate of fuel comsumption, while satisfactory responsive property in acceleration and the maximum output horse power of the engine is to be ensured by reducing air-fuel ratio i.e. enriching air-fuel mixture.

Preferably, in a normal travelling period in which the output of the detecting means is smaller than the maximum output, the opening of a throttle valve in an intake path is held approximately at 100%, i.e. at WOT to thereby utilize performance of the engine to its maximum.

Preferably the detecting means detects a pressing amount of an accelerator pedal.

The air-fuel ratio controlling means controls air-fuel ratio by controlling fuel injection amount for example. While the fuel injection amount is increased, i.e. acceleration fuel increment is carried out to improve driveability in transient time, transmission torque in CVT is also increased with the acceleration fuel increment. Hence, to prevent the transmission of torque from the occurrence of troubles, belt pressing force in CVT and thus, line pressure in a hydraulic cylinder for the output side disk of CVT are controlled in relation to acceleration fuel increment.

Preferably in transient time, air-fuel ratio is lowered during speed change of CVT to provide rapidly required output horse power and improve the driveability.

The decrement of air-fuel ratio is preferably a function of rotational frequency of an engine and/or pressing amount of an accelerator pedal to provide engine output matched with necessary degree of acceleration.

Preferably, to increase running time of WOT, a linkage between the accelerator pedal and a throttle valve is constituted to maximize the opening of the throttle valve before the pressing amount of the accelerator pedal is maximized.

BRIEF DESCRIPTION OF THE DRAWINGS

FIG. 4 is a table showing the correspondence of the pressing rate of accelerator pedal Acc to desired input side rotational frequency Nin* and air-fuel ratio A/F of CVT in apparatus without a throttle actuator;

DETAILED DESCRIPTION OF PREFERRED EMBODIMENTS

The basic concept of the present invention will be described with reference to FIG. 3 which shows the running line of a normally run engine as the line of the optimum rate of fuel consumption. In the present invention the running range of the engine is divided in relation the pressing amount $X_{acc}$ of accelerator pedal into throttle range, economy range and power range sequentially from smaller pressing amount $X_{acc}$. In the throttle range, as the pressing amount $X_{acc}$ of accelerator pedal is increased, the opening $\theta_{th}$ of throttle in an intake system is increased to increase the output horse power of engine PS (output torque Te of engine x rotational frequency Ne of engine). In the economy and power ranges, irrespective of the increase of the pressing amount $X_{acc}$ of accelerator pedal, the opening $\theta_{th}$ of throttle in the intake system is maintained at 100%. In the economy range, as the throttle valve opening $\theta_{th}$ is increased, the rotational speed of the engine is increased, or the speed ratio e of CVT (e = rotational speed at the output side Nout/rotational speed at the input side Nin) is decreased, so that the output horse power PS of engine is increased with the pressing amount $X_{acc}$ of accelerator pedal. In the throttle and economy ranges, the air-fuel ratio of air-fuel mixture in the combustion chamber of engine is set larger than the stoichiometrical air-fuel ratio. When transfer is made from the economy range to the power range, the rotational speed Ne of engine is initially maintained approximately constant as the pressing amount $X_{acc}$ is increased and the output torque Te of engine is increased by enriching the air-fuel mixture gradually so as to increase the output horse power PS of engine. When the air-fuel ratio reaches a predetermined value smaller than the stoichiometrical air-fuel ratio, the output horse power PS of engine is thereafter increased by increasing the rotational speed Ne of engine as the pressing amount $X_{acc}$ is increased and finally reaches the maximum output horse power point PS1. Thus, in the economy range, rate of fuel consumption is improved by running the engine with lean air-fuel mixture in WOT while the maximum output horse power needed at the minimum for the engine is to be obtained from pressing the accelerator pedal at the maximum. Further the broken line in FIG. 3 will be described with reference to FIG. 6.

In the Japanese prior patent application No. 40747/82, the output torque Te of engine is controlled by varying the opening $\theta_{th}$ of throttle with a throttle actuator, and the rotational speed Ne of engine is controlled by varying speed ratio e of CVT.

Figure 1:
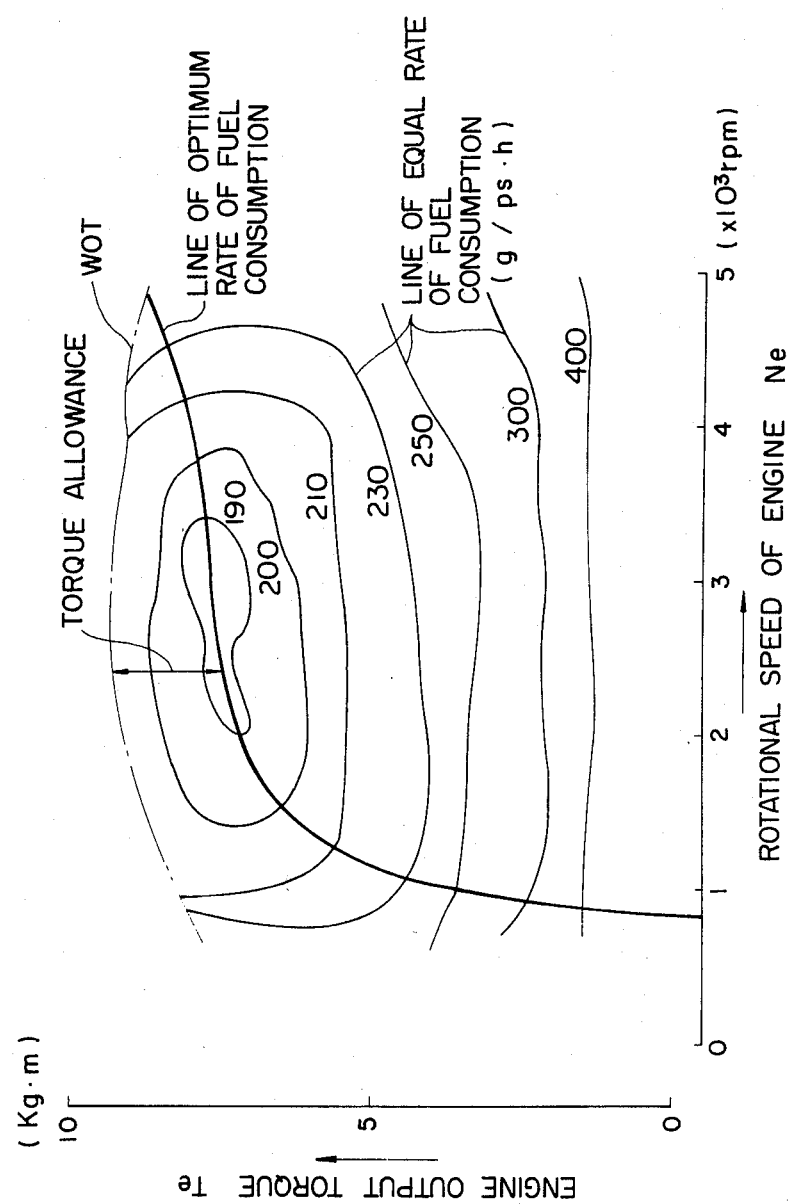
FIG. 1 is a diagram showing lines of the optimum rate of fuel consumption in prior apparatus.
Figure 2:
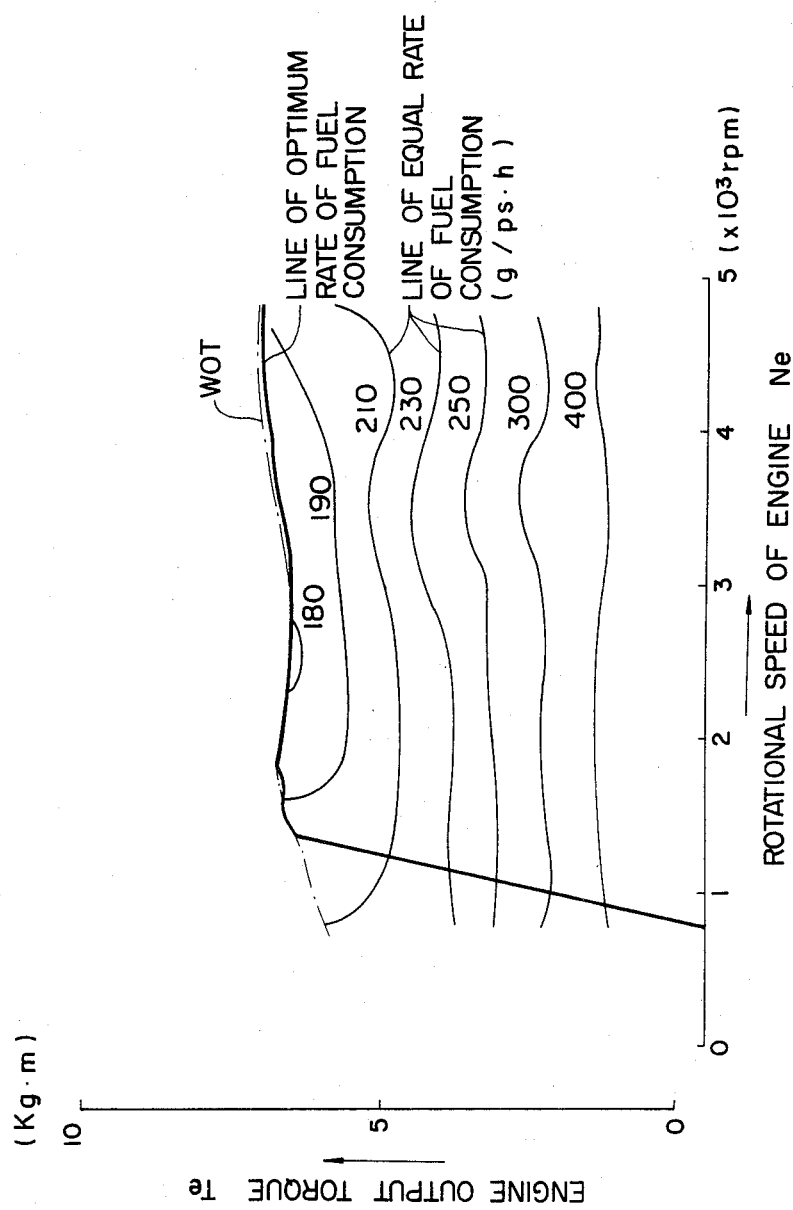
FIG. 2 is a diagram showing line of the optimum rate of fuel consumption matched with WOT in an engine run with lean air-fuel mixture.
Figure 3:
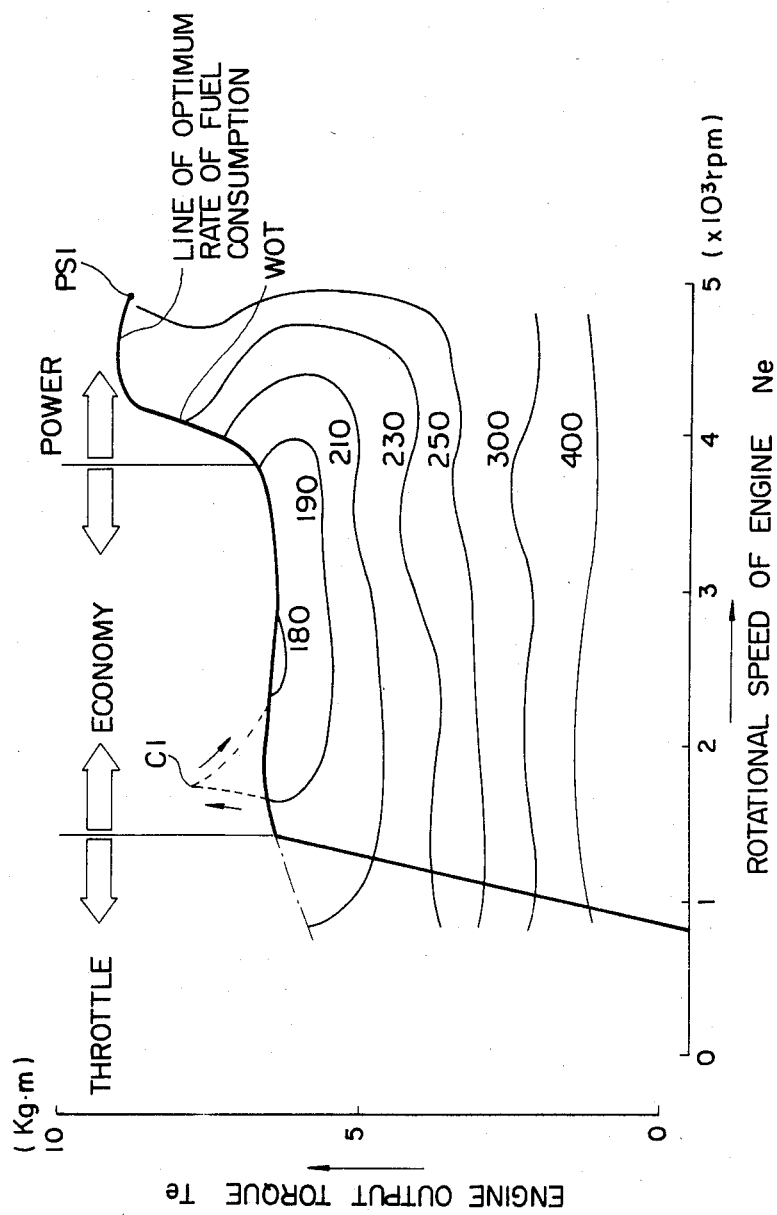
FIG. 3 is a diagram showing line of the optimum rate of fuel consumption according to the present invention.
Figure 5:
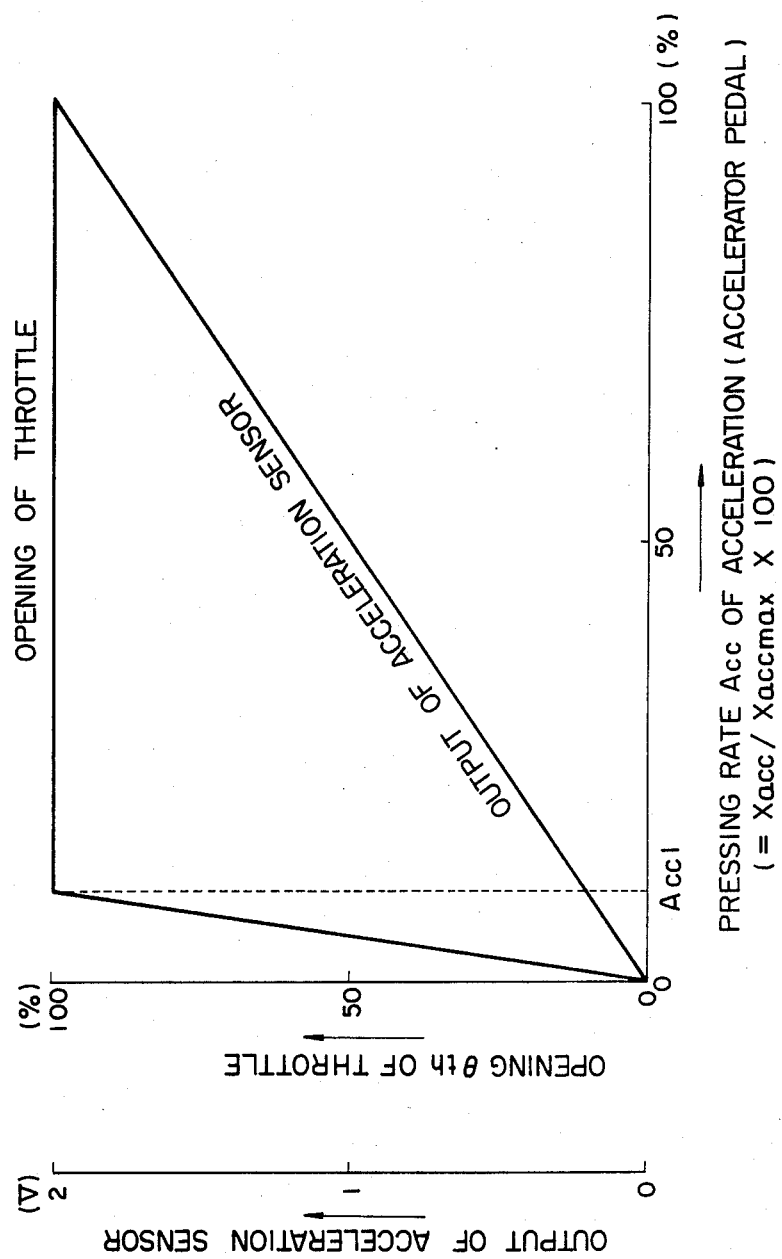
FIG. 5 is a graph showing the relationship between the pressing rate of accelerator pedal Acc, the output of an acceleration sensor and the opening $\theta_{th}$ of a throttle.

In said Japanese prior patent application No. 67362/82, since the throttle actuator is not provided, the desired input side rotational speed Nin* (= desired rotational speed Ne* of engine) and air-fuel ratio A/F of CVT are set as functions of the pressing rate Acc (= $X_{acc}/X_{acc}$ max × 100) of accelerator pedal as shown on the table in FIG. 4, and engine running along the line of the optimum rate of fuel consumption defined in FIG. 3 is achieved by controlling Nin* and A/F, i.e. fuel injection amount or fuel injection time. Also, a linkage between the accelerator pedal and the throttle valve is set so that Acc is related to the opening $\theta_{th}$ of throttle as shown in FIG. 5, i.e. $\theta_{th}$ is increased as Acc is increased in the case of Acc<Acc1, $\theta_{th}$=100% in the case of Acc=Acc1 and $\theta_{th}$=100% is maintained in the case of Acc>Acc1. Such linkage can be readily embodied only by modifying a portion of prior linkage. Further, an acceleration sensor for detecting the pressing degree Acc is of type which generates output voltage proportional to Acc as shown in FIG. 5.

A method for improving accelerating property in the throttle and economy ranges will be described with reference to FIG. 6.

Figure 6:
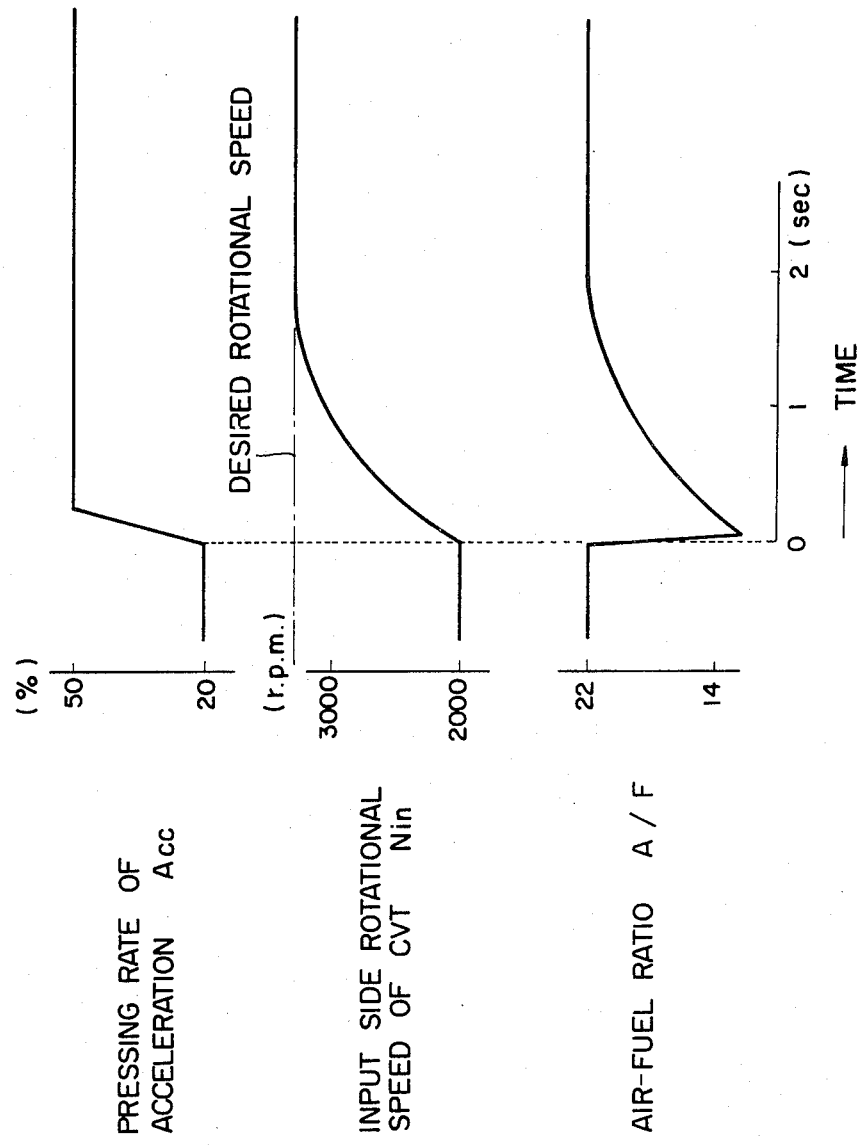
FIG. 6 is a graph showing the change of the pressing rate of accelerator pedal Acc, etc. with the passage of time in transient time.

Assume that the pressing rate Acc of accelerator pedal is increased from 20% to 50% as shown in FIG. 6. It takes time for the input side rotational speed Nin of CVT to follow up the change in Acc due to delay of speed ratio control for CVT. Thus, according to the present invention, in the transient period that Nin reaches the desired value Nin* the air-fuel ratio A/F is decreased, i.e. fuel injection amount is increased to increase the output torque Te of engine. The fuel injection amount can be rapidly controlled with high accuracy by controlling fuel injection pulses sent to fuel injectors in an intake system. In the normal running, there is the relationship represented by the following formula between the desired output torque Te* of engine, desired input side rotational speed Nin*, actual output torque Te of engine and actual rotational speed Nin of engine;

$$Te^* \cdot Nin^* = Te \cdot Nin \tag{1}$$

Thus, storage $\Delta Te$ of the output torque of engine in transient time is represented by the following formula;

$$\Delta Te = Te^* - Te \tag{2}$$

$$= Te^* \cdot \left( \frac{Nin - Nin^*}{Nin^*} \right)$$

Thus, in the transient time, degradation of accelerating property due to the delay of CVT is compensated for by increasing the fuel injection amount by an amount corresponding to $\Delta Te$. Since Te*, Nin* (=Ne*) in the formula (2) are functions of Acc, acceleration fuel increment is to be represented as a function of Acc and Nin. The change in the running condition of engine in such transient time is shown by the broken line in FIG. 3. It returns to the normal running line along equal horse power rate line after it moves to point C1 at which required horse power determined by Acc is obtained.

Figure 7:
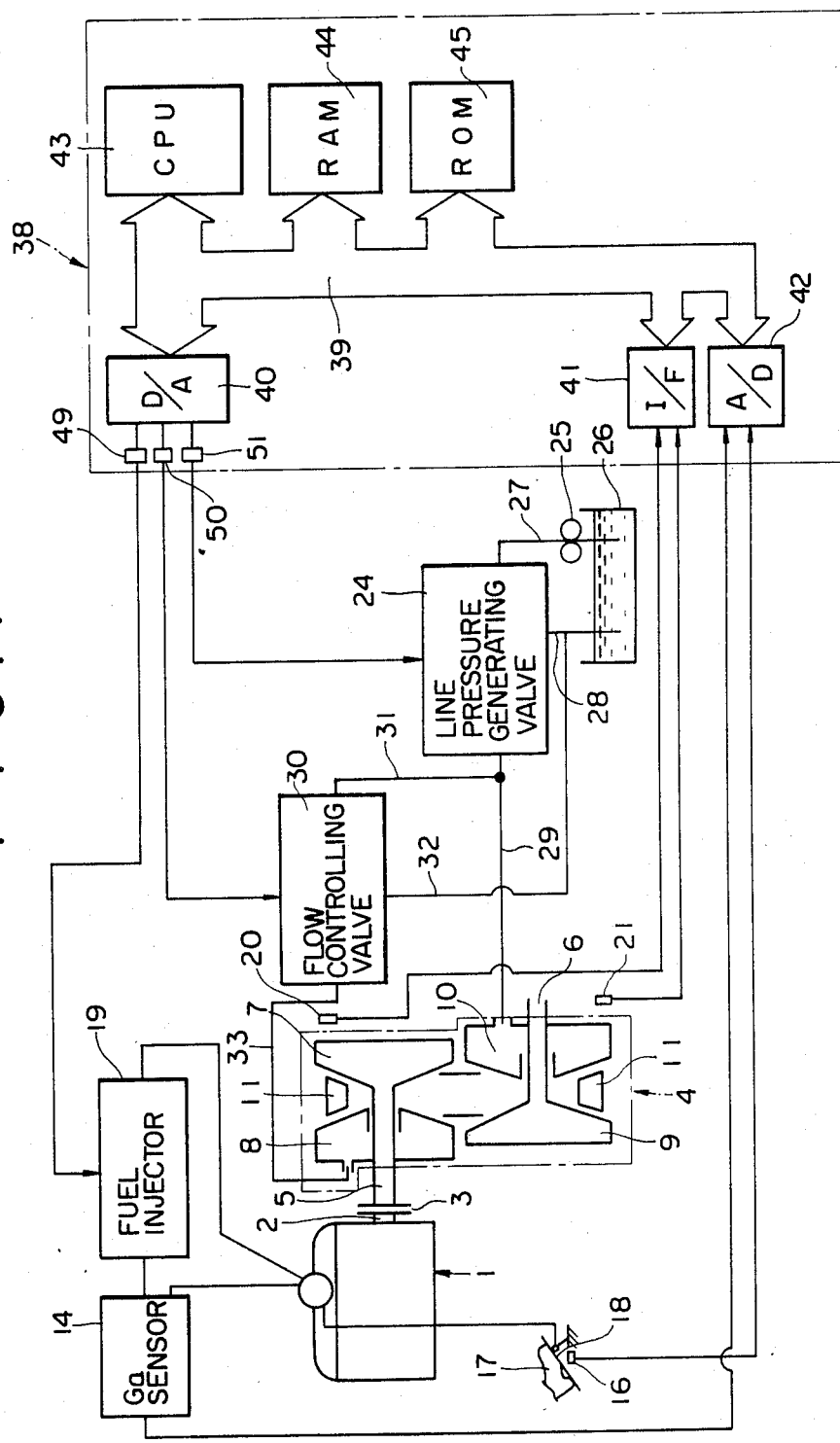
FIG. 7 is a schematic illustration showing the whole power transmission for a vehicle.

FIG. 7 shows the whole power transmission for a vehicle according to the present invention.

While various prior mechanisms have been proposed for CVT, a mechanism in FIG. 7 will be described which is of a compact belt driven system capable of transmitting large torque.

In FIG. 7, an output shaft 2 of an internal combustion engine 1 is connected to an input shaft 5 of CVT 4 through a clutch 3. The input shaft 5 and an output shaft 6 are provided parallel to each other and an input side fixed disk 7 is secured fixedly to the input shaft 5. An input side movable disk 8 fits on the outer periphery of the input shaft 5 to be axially moved through a spline, ball bearing or the like, and an output side fixed disk 9 is secured fixedly to the output shaft 6. An output side movable disk 10 fits on the outer periphery of the output shaft 6 to be axially moved through a spline, ball bearing or the like. Further the pressure receiving area of the movable side disk is set to provide the input side>output put side, and the fixed and movable disks in the input and output sides are axially arranged oppositely to each other. The opposed surfaces of the fixed disks 7, 9 and movable disks 8, 10 are formed tapered to increase radially outward the distance between themselves, and a belt 11 having a trapezoidal section is trained over the disks at the input and output sides. Thus the radial contacting positions of the belt 11 on the disk surfaces are continuously changed according to change in the fastening force between the fixed and movable disks. When the contacting positions of the belt 11 on the surfaces of the input side disks 7, 8 are moved radially outward, the contacting positions of the belt 11 on the surfaces of the output side disks 9, 10 are moved radially inward to increase the speed ratio e $$\left( = \frac{\text{rotational speed of output shaft 6}}{\text{rotational speed of input shaft 5}} \right)$$

of CVT 4 and decrease e in the reverse case. Power of the output shaft 6 is transmitted to drive wheels not shown.

A Ga sensor 14 consists of an air flow meter and temperature sensor to detect weight flow of intake air. An acceleration sensor 16 detects the pressing amount of an accelerator pedal 18 pressed by a foot 17 of a driver. An intake throttle valve in the internal combustion engine 1 is connected to the accelerator pedal 18 through a link. A fuel injector 19 is mounted on the neighborhood of an intake port to inject fuel into the intake system. Input and output side rotational angle sensors 20, 21 detect respectively the rotational angles of the disks 7, 10, thus rotational speeds thereof.

A line pressure generating valve 24 controls relief amount of hydraulic medium, i.e. oil sent from a reservoir 26 through an oil path 27 into an oil path 28 by an oil pump 25 to regulate line pressure Pl in an oil path 29. A hydraulic servo for the output side movable disk 10 is supplied through the oil path 29 with the line pressure Pl. A flow controlling valve 30 controls an amount of oil flowing into and out of the input side movable disk 8. To maintain the speed ratio e of CVT 4 constant, an oil path 33 is disconnected from a line pressure oil path 31 branched from the oil path 29 and a drain oil path 32, i.e. the axial position of the input side movable disk 8 is maintained constant. To increase the speed ratio e, oil is supplied from the oil path 31 to the oil path 33 to increase fastening force between the input side disks 7, 8. To reduce the speed ratio e, oil pressure in the hydraulic servo of the movable disk 8 is conducted to the atmospheric side through the drain oil path 32 to reduce thrust between the input side disks 7, 8. While oil pressure in the oil path 33 is lower than the line pressure Pl, working area of a piston of the hydraulic servo for the input side movable disk 8 is larger than working area of a piston of the hydraulic servo for the output side movable disk 10 so that the fastening force between the input side disks 7, 8 can be made larger than the fastening force between the output side disks 9, 10.

An electronic control unit 38 comprises a D/A (digital/analog) converter 40, an input interface 41, an A/D (analog/digital) converter 42, CPU 43, RAM 44 and ROM 45 interconnected through an address data bus 39. The analog outputs of the Ga sensor 14, torque sensor 15 and acceleration sensor 16 are sent to A/D converter 42, and pulses of the rotational angle sensors 20, 21 are sent to the input interface 41. The outputs of the electronic control unit 38 are sent from D/A converter 40 to the fuel injector 19, flow controlling valve 30 and line pressure generating valve 24 through amplifiers 49, 50, 51 respectively.

Figure 8:
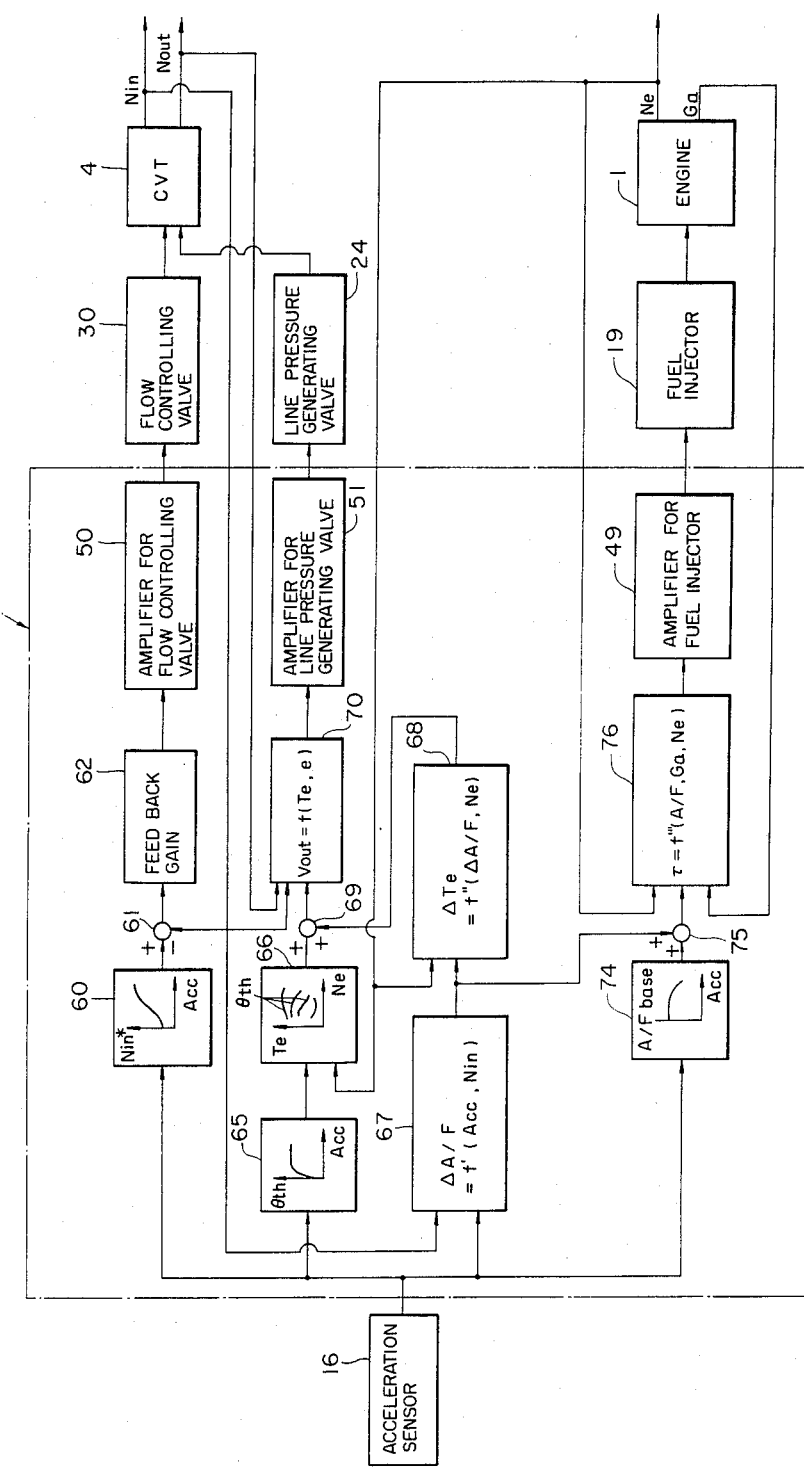
FIG. 8 is a block diagram of the present invention.

FIG. 8 is a block diagram of the present invention.

In a block 60, from the pressing rate Acc of an accelerator pedal 18 detected by the acceleration sensor 16 is computed desired input side rotational speed Nin*. In an adding point 61 is figured out deviation Nin*-Nin which is sent to the flow controlling valve 30 through a feedback gain 62 and an amplifier 50 for the flow controlling valve and the speed ratio e of CVT 4, thus the input side rotational speed Nin are controlled. As a result, Nin is controllably fed back to become Nin*. In a block 65, the opening $\theta_{th}$ of throttle is figured out as a function of Acc, and in a block 66 the engine output torque Te in the normal running is figured out as a function of $\theta_{th}$ and rotational speed Ne of engine. In a block 67, correcting amount $\Delta A/F$ of air-fuel ratio A/F is figured out as a function f' of Acc and Nin. In a block 68, increment $\Delta Te$ of engine output torque Te in the transient time is figured out as a function f'' of $\Delta A/F$ and Ne. In an adding point 69, $Te + \Delta Te$ is figured out. In a block 70, voltage Vout applied to the controlling amplifier 51 for the line pressure generating valve is figured out as a function f of Te ($\leftarrow Te + \Delta Te$) and e (=Nout/Nin). For example, Vout = K'·Te/e and Vout is proportional to the output side torque Tout of CVT 4, provided K' is a constant. Consequently, the line pressure is controlled approximately to the minimum value causing no slip on the belt 11 to restrain power loss. In a block 74, the basic air-fuel ratio A/Fbase in the normal running is figured out of Acc. On an adding point 75, A/F (=A/Fbase+$\Delta A/F$) is figured out. In a block 76, pulse width of fuel injection pulse sent to the fuel injector 19, i.e. fuel injection time $\tau$ is computed from the air-fuel ratio A/F, weight flow Ga of intake air and rotational speed Ne of engine. $\tau$ is sent to the fuel injector 19 through the fuel injector amplifier 49. As a result, in spite of control delay on Nin of CVT 4, shortage of engine output horse power caused by the control delay is compensated for by enriching air-fuel mixture, i.e. correcting amount $\Delta A/F$ of air fuel ratio A/F to ensure satisfactory accelerating property. Also, in the power range determined by the pressing rate Acc, the maximum output horse power needed at the minimum is ensured by decreasing A/F* and increasing Nin*.

Figure 9:
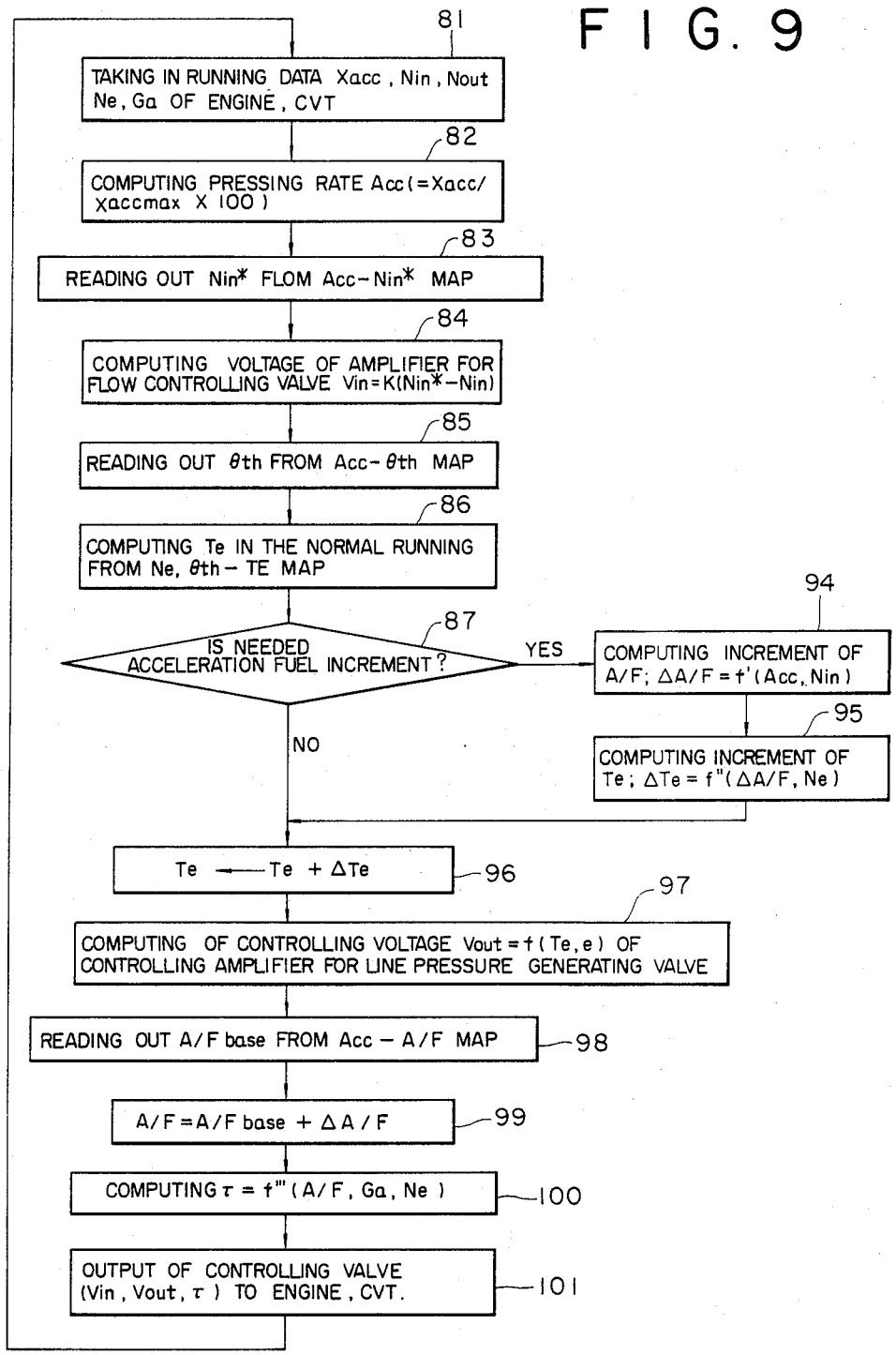
FIG. 9 is a flow chart of algorithm according to the present invention.

FIG. 9 is a flow chart of algorithm according to the present invention. In step 81, running data $X_{acc}$, Nin, Nout, Ne and Ga of engine and CVT are taken in, provided, in the embodiment of FIG. 7, Nin=Ne. In step 82, the pressing rate Acc of the accelerator pedal 18 is figured out as Acc = $X_{acc}/A_{acc}$ max × 100. In step 83, Nin* is read out of Acc-Nin'' map defined according to table in FIG. 4. In step 84, the control voltage Vin set to the amplifier 50 for flow controlling valve is figured out of Vin = K(Nin*−Nin). In step 85, the opening $\theta_{th}$ of throttle is read out of Acc−$\theta_{th}$ map defined according to the graph in FIG. 5. In step 86, the engine output torque Te in the normal running is figured out of Ne and $\theta_{th}$−Te maps defined according to the optimum fuel consumption line in FIG. 3. In step 87, whether or not acceleration increment of fuel is needed is judged, i.e. whether or not it is the transient time that is judged. If it is the transient time, advance is made to step 94 and to step 96 if not. In step 94, increment $\Delta A/F$=f' (Acc, Nin) of A/F is figured out. In step 95, increment $\Delta Te$=f'' ($\Delta A/F$, Ne) of engine output torque Te due to $\Delta A/F$ is figured out. In step 96, Te+$\Delta Te$ is substituted into Te. In step 97, the output voltage Vout applied to the controlling amplifier 51 for line pressure generating valve is figured out. In step 98, the basic air fuel ratio A/Fbase is read out of Acc−A/F map. In step 99, A/Fbase+ΔA/f is substituted into A/F. In step 100, fuel injection time τ=f′ (A/F, Ga, Ne) is figured out. In step 101, the outputs of the respective control valves (Vin, Vout, τ) are supplied to the engine and CVT 4.

What is claimed is:

1. A control for a vehicle provided with:
   (a) a continuously variable speed system power transmission which utilizes a continuously variable transmission comprising:
      (i) a belt trained over a plurality of disks, at least one of said plurality of disks being movable to control the speed of the belt, and
      (ii) a pressing force controlling means for controlling the force with which the belt presses against said disks in relation to acceleration fuel increments;
   (b) an engine having a combustion chamber, said engine being operatively connected to said continuously variable transmission;
   (c) a fuel injector operatively connected to said engine;
   (d) an accelerator pedal operatively connected to said engine to control engine speed;
   (e) an air-flow rate detecting means operatively connected to said fuel injector;
   (f) a line pressure generating valve;
   (g) a hydraulic pressure means operatively connected to said line pressure generating valve;
   (h) a flow controlling valve operatively connected to said line pressure generating valve and to said pressing force controlling means;
   (i) an electronic control unit having inputs from said engine and from said air-flow rate detecting means and outputs to said fuel injector, said flow controlling valve, and said line pressure generating valve;
   (j) a torque sensor operatively connected to said engine and having an input to said electronic control unit;
   (k) a rate of acceleration detecting means operatively connected to said accelerator pedal and having an input to said electronic control unit;
   (l) a first angle sensor operatively connected to a first one of said plurality of disks mounted on a first shaft and having an input to said electronic control unit; and
   (m) a second angle sensor operatively connected to a second one of said plurality of disks mounted on a second shaft and having an input to said electronic control unit,
   said control comprising:
   (n) a detecting means for detecting acceleration and deceleration intended by a driver;
   (o) a computation means for figuring out desired air-fuel ratios in said combustion chamber and the desired speed ratios of said continuously variable transmission in relation to the output of said detecting means;
   (p) a speed ratio controlling means for controlling the speed ratio of said continuously variable transmission such that the speed ratio of the continuously variable transmission becomes the desired speed ratio; and
   (q) an air-fuel ratio controlling means for controlling the air-fuel ratio such that the air-fuel ratio in the combustion chamber becomes the desired air-fuel ratio, the air-fuel ratio being lowered together with the speed ratio of said continuously variable transmission during transient periods in which the input side rotational speed of said engine (Nin) does not equal the desired input side rotational speed of said engine (Nin*), the amount by which the air-fuel ratio is lowered being a function of the rotational speed of the engine.

2. A control as recited in claim 1 wherein said at least one of said plurality of disks which is movable to control the speed of the belt is the output side disk of the continuously variable transmission and it is moved by means of a hydraulic cylinder, said pressing force controlling means being adapted to control line pressure sent to said hydraulic cylinder.

3. A control for a vehicle provided with:
   (a) a continuously variable speed system power transmission which utilizes a continuously variable transmission comprising:
      (i) a belt trained over a plurality of disks, at least one of said plurality of disks being movable to control the speed of the belt, and
      (ii) a pressing force controlling means for controlling the force with which the belt presses against said disks in relation to acceleration fuel increments;
   (b) an engine having a combustion chamber, said engine being operatively connected to said continuously variable transmission;
   (c) a fuel injector operatively connected to said engine;
   (d) an accelerator pedal operatively connected to said engine to control engine speed;
   (e) an air-flow rate detecting means operatively connected to said fuel injector;
   (f) a line pressure generating valve;
   (g) a hydraulic pressure means operatively connected to said line pressure generating valve;
   (h) a flow controlling valve operatively connected to said line pressure generating valve and to said pressing force controlling means;
   (i) an electronic control unit having inputs from said engine and from said air-flow rate detecting means and outputs to said fuel injector, said flow controlling valve, and said line pressure generating valve;
   (j) a torque sensor operatively connected to said engine and having an input to said electronic control unit;
   (k) a rate of acceleration detecting means operatively connected to said accelerator pedal and having an input to said electronic control unit;
   (l) a first angle sensor operatively connected to a first one of said plurality of disks mounted on a first shaft and having an input to said electronic control unit; and
   (m) a second angle sensor operatively connected to a second one of said plurality of disks mounted on a second shaft and having an input to said electronic control unit,
   said control comprising:
   (n) a detecting means for detecting acceleration and deceleration intended by a driver;
   (o) a computation means for figuring out desired air-fuel ratios in said combustion chamber and the desired speed ratios of said continuously variable transmission in relation to the output of said detecting means;
   (p) a speed ratio controlling means for controlling the speed ratio of said continuously variable transmission such that the speed ratio of the continuously variable transmission becomes the desired speed ratio; and (q) an air-fuel ratio controlling means for controlling the air-fuel ratio such that the air-fuel ratio in the combustion chamber becomes the desired air-fuel ratio, the air-fuel ratio being lowered together with the speed ratio of said continuously variable transmission during transient periods in which the input side rotational speed of said engine (Nin) does not equal the desired input side rotational speed of said engine (Nin*), the amount by which the air-fuel ratio is lowered being a function of the amount by which said accelerator pedal is pressed.

4. A control as recited in claim 3 wherein said at least one of said plurality of disks which is movable to control the speed of the belt is the output side disk of the continuously variable transmission and it is moved by means of a hydraulic cylinder, said pressing force controlling means being adapted to control line pressure sent to said hydraulic cylinder.

* * * * *